(12) United States Patent
Maida et al.

(10) Patent No.: US 8,364,194 B2
(45) Date of Patent: Jan. 29, 2013

(54) BASESTATION POWER CONTROL

(75) Inventors: Aminu Wada Maida, Swindon (GB);
Stephen Whittaker, Berkshire (GB);
Damien Le Gresley, Wiltshire (GB)

(73) Assignee: Ubiquisys Limited, Wiltshire (GB)

( * ) Notice: Subject to any disclaimer, the term of this patent is extended or adjusted under 35 U.S.C. 154(b) by 348 days.

(21) Appl. No.: 12/936,381

(22) PCT Filed: Apr. 16, 2009

(86) PCT No.: PCT/GB2009/050377
§ 371 (c)(1),
(2), (4) Date: Oct. 4, 2010

(87) PCT Pub. No.: WO2009/127874
PCT Pub. Date: Oct. 22, 2009

(65) Prior Publication Data
US 2011/0039596 A1    Feb. 17, 2011

(30) Foreign Application Priority Data

Apr. 16, 2008    (GB) .................................. 0806940.3

(51) Int. Cl.
*H04Q 7/32*    (2006.01)
(52) U.S. Cl. ............ 455/522; 455/69; 455/68; 455/500; 455/517; 455/67.11; 370/310; 370/328; 370/329; 370/343; 370/338
(58) Field of Classification Search .................. 455/522, 455/69, 68, 127.1, 500, 517, 67.11, 550.1, 455/561, 507, 423–425, 509, 513, 515, 426.1, 455/426.2, 403, 422.1, 445; 370/310, 328, 370/329, 343, 338
See application file for complete search history.

(56) References Cited

U.S. PATENT DOCUMENTS

2003/0189907 A1* 10/2003 Miyamoto et al. ............ 370/320
2007/0254620 A1    11/2007 Lindqvist et al.

FOREIGN PATENT DOCUMENTS

GB            2446196            8/2008

OTHER PUBLICATIONS

PCT International Search Report and Written Opinion dated Sep. 28, 2009 issued in PCT/GB2009/050377.
UK Intellectual Property Office Search Report dated Aug. 15, 2008 issued in GB0806940.3.
3GPP-Standards, 2500 Wilson Boulevard, Suite 300, Arlington, Virginia 22201 USA, Mar. 1, 2004, XP040292900.

(Continued)

*Primary Examiner* — Keith Ferguson
(74) *Attorney, Agent, or Firm* — Weaver Austin Villeneuve & Sampson LLP

(57) ABSTRACT

A basestation, for use in a cellular communications network, has a mechanism for reporting its transmit power. When the transmit power of the basestation is outside a reportable range, it reports an adjusted transmit power within the reportable range, and also transmits an adjustment factor, by which the adjusted transmit power differs from the transmit power. The basestation is also configured to adapt its power settings based on a reported transmit power of at least one other basestation, and is further configured to detect the reported transmit power of the at least one other basestation and to detect an adjustment factor transmitted separately by the at least one other basestation, and to adapt its power settings based on a sum of the reported transmit power and the adjustment factor.

12 Claims, 3 Drawing Sheets

OTHER PUBLICATIONS

"3rd Generation Partnership Project; Technical Specification Group Radio Access Network; Low Output Powers for general purpose FDD BSs (Release 6)" 3GPP Draft; TR 25.8XX—Low Output Powers for General Purpose FDD BSS, 3rd Generation Partnership Project (3GPP), Mobile Competence Centre; 650, Route Des Lucioles; F-06921 Sophia-Antipolis Cedex, France, vol. RAN WG3, No. Paris, France; 20030514, May 14, 2003, XP050154887, pp. 4-6.

* cited by examiner

BASESTATION POWER CONTROL

CROSS-REFERENCE TO RELATED APPLICATIONS

This application is a national stage filing under 35 U.S.C. 371 of International Application PCT/GB2009/050377, filed on Apr. 16, 2009, which claims priority from GB Application No. 0806940.3, filed Apr. 16, 2008. Each of these applications is incorporated herein by reference in its entirety and for all purposes.

This invention relates to a power control system, for use in a basestation of a mobile communication system.

It is recognized that power control of transmissions in a mobile communications system is important, particularly in cellular systems using Code Division Multiple Access (CDMA), but not only in such systems. If transmission powers are too low, then transmitted signals will not be able to be received correctly. However, if transmission powers are too high, this implies excessive battery use (in the case of uplink transmissions, from the wireless device to the basestation), and an increased possibility of interference with other transmissions, and hence reduced system capacity. Therefore, communications standards that define the requirements of such systems describe in detail the manner in which such power control can be achieved.

For example, the 3GPP specifications define the format of messages that can be exchanged between a cellular basestation and a mobile terminal, in order to achieve the required transmission powers.

There now exist femtocell basestations, which are intended to provide cellular coverage over small areas, for example within a user's home or office premises. It has been found that the messages defined in the 3GPP specifications do not adequately cover all of the possible deployments of such a femtocell basestation.

According to an aspect of the present invention, there is provided a basestation, for use in a cellular communications network, having a mechanism for reporting its transmit power, the basestation being configured, when its transmit power is outside a reportable range, to report an adjusted transmit power within the reportable range, and also to transmit an adjustment factor, by which the adjusted transmit power differs from the transmit power.

According to a second aspect of the present invention, there is provided a basestation, for use in a cellular communications network, wherein the basestation is configured to adapt its power settings based on a reported transmit power of at least one other basestation, and is further configured to detect the reported transmit power of the at least one other basestation and to detect an adjustment factor transmitted separately by the at least one other basestation, and to adapt its power settings based on a sum of the reported transmit power and the adjustment factor.

For a better understanding of the present invention, and to show how it can be put into effect, reference will now be made, by way of example, to the accompanying drawings, in which:—

Figure 1:
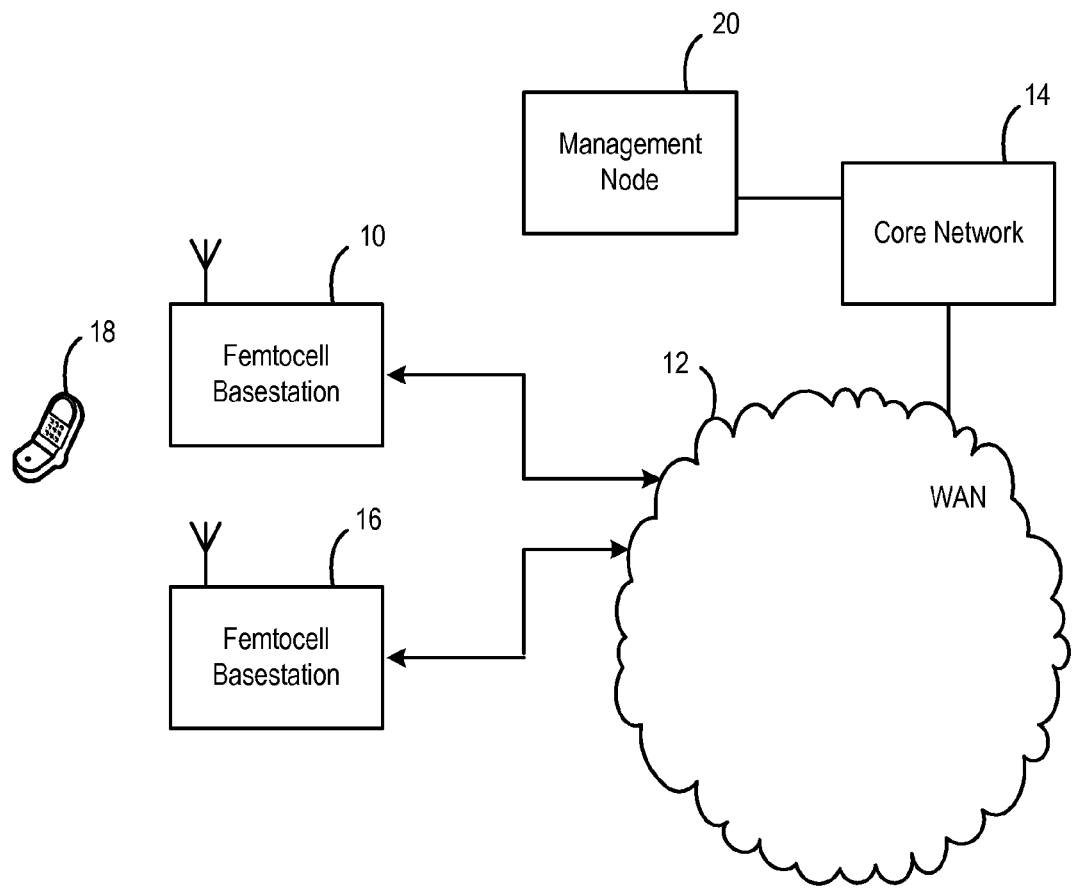
FIG. 1 illustrates a part of a mobile communications network.

FIG. 1 illustrates a part of a cellular mobile communications network. A first femtocell basestation 10 has a connection to a wide area network (WAN) 12 such as the internet, allowing it to connect into the core network 14 of a mobile network operator. A second femtocell basestation 16 operated by the same mobile network operator has a similar connection over the wide area network (WAN) 12, allowing it too to connect into the core network 14. Part of the core network 14 is a management node 20, which is able to monitor the operation of the femtocell basestations 10, 16, and is able to send information to them over the wide area network 12.

As is recognized, each of the femtocell basestations 10, 16 is intended to provide coverage over a small area, for example within a particular property, allowing a mobile terminal, such as the mobile phone 18, to establish a connection to one of the femtocell basestations, and therefore obtain a cellular service. It will therefore be appreciated that the femtocell basestations 10, 16 may be located very close to one another, for example on either side of a wall dividing two properties, or on different floors of a building.

At the same time, since the femtocell basestations 10, 16 are only intended to provide coverage over small areas, they do not need to transmit with high power, and a mobile terminal in communication with a femtocell basestation does not need to transmit with high power.

It is therefore important to provide suitable power control algorithms, in order to reduce the possibility of interference between the relevant transmissions.

In this illustrated embodiment, the mobile communications network containing the femtocell basestations 10, 16 is operating in accordance with the 3GPP specifications, which define the power control algorithms to be performed by basestations and by mobile devices.

The femtocell basestations 10, 16 operate in substantially the same way as conventional basestations, and this will not be described further, except as required for an understanding of the present invention. However, it is worth noting that each femtocell basestation 10, 16 is able to detect transmissions from other cellular basestations, including other femtocell basestations. That is, each femtocell basestation 10, 16 includes circuitry for detecting transmissions on system downlink frequencies, as well as the circuitry that it must include to be able to detect transmissions on system uplink frequencies.

As mentioned above, basestations and wireless devices must operate with suitable power control. The femtocell basestations 10, 16 therefore detect the powers of signals transmitted from other basestations, including other femtocell basestations and macrocell basestations, and set their initial maximum downlink power and their initial maximum uplink power based on these detected powers. A detailed description of the mechanism by which these parameters are set is not required for an understanding of the present invention. However, one feature of the power control is that, when femtocell basestations are located close together, they set their initial maximum downlink powers to be equal. This avoids the situation where each might otherwise be trying to increase its power to be higher than the other.

One femtocell basestation, in order to determine the initial maximum downlink power of a nearby femtocell basestation, can in principle use the value for the CPICH (Common Pilot Channel) transmit power that is broadcast by that nearby femtocell basestation in accordance with the 3GPP specifications. However, femtocell basestations can be deployed in ways not envisaged in the 3GPP specifications, with the result that the nearby femtocell basestation may not be able to report its CPICH transmit power accurately using the mechanism provided in the 3GPP specifications.

Figure 2:
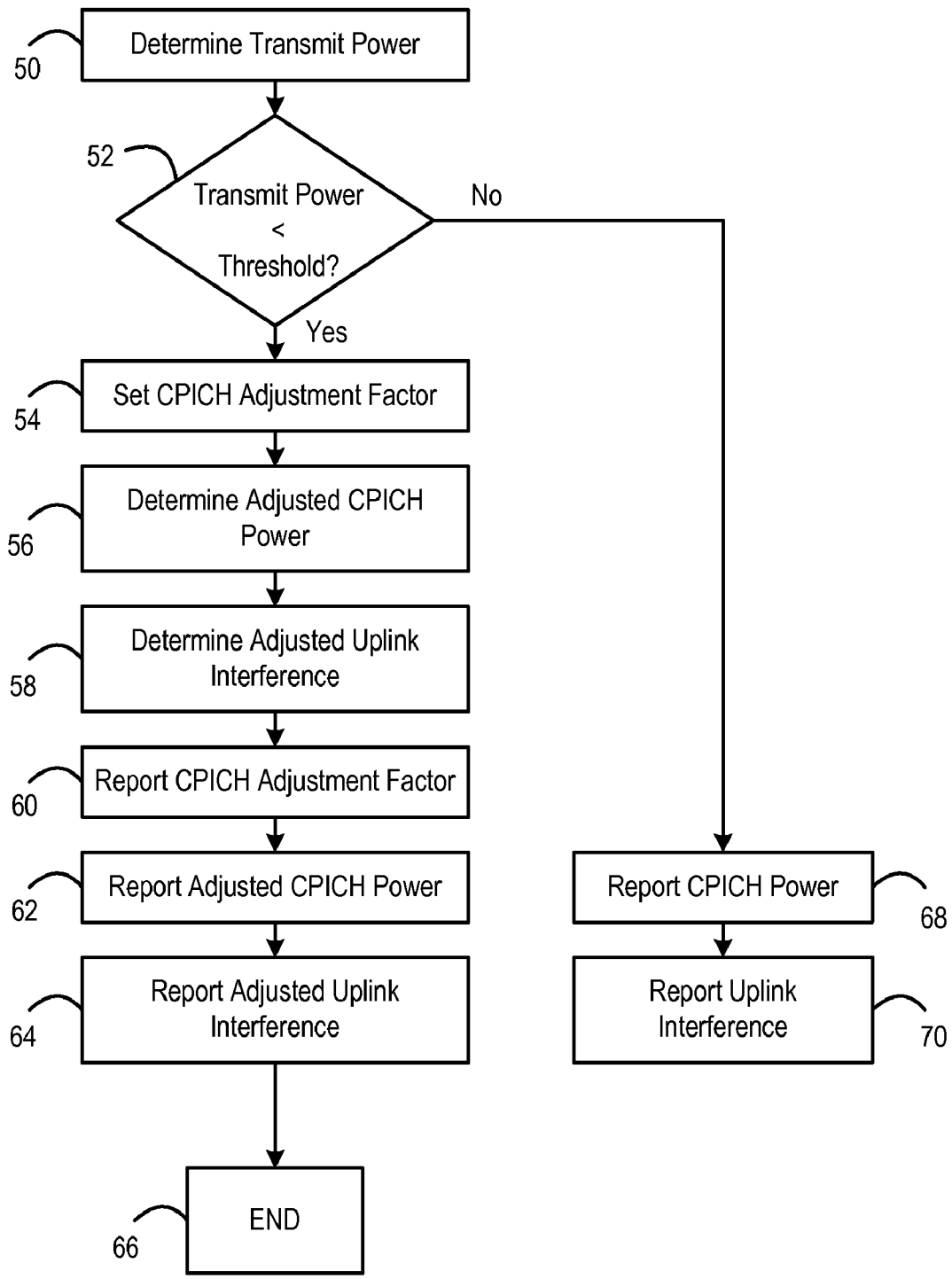
FIG. 2 is a flow chart, illustrating a first method in accordance with the invention.

FIG. 2 therefore illustrates a method, by which a femtocell basestation can report its transmit power.

In step 50, the femtocell basestation determines its present transmit power, and in particular its present value for the variable CPICH_Tx_Power. As mentioned above, the 3GPP specification defines a mechanism by which a basestation can report this value, by including the value in a specified one of the system information blocks. Mobile devices in the coverage area of the basestation can detect the reported value, as required.

However, the 3GPP standard only allows values within the range 50 dBm to −10 dBm to be reported, whereas femtocell basestations may be deployed in situations where the CPICH transmit power may be within the range 0 dBm to −35 dBm.

In step 52, the femtocell basestation determines whether the present value for the variable CPICH_Tx_Power is lower than a threshold value. In this illustrated embodiment, the threshold value is the lowest value that can be reported in accordance with the standard but other threshold values could be set.

If the present value for the variable CPICH_Tx_Power is lower than the threshold value, the process passes to step 54, in which a value is set for a new parameter, in the form of a CPICH adjustment factor CPICH_Adjustment. The value of the CPICH adjustment factor is set as:

CPICH_Adjustment=CPICH_Tx_Power_Min−
CPICH_Tx_Power where CPICH_Tx_Power_Min is the lowest value that can be reported in accordance with the standard, i.e. −10 dBm in this case.

In step 56, an adjusted CPICH transmit power value CPICH_Tx_Power_Adjusted is derived, as the sum of the real CPICH transmit power value and the CPICH adjustment factor, i.e.:

CPICH_Tx_Power_Adjusted=CPICH_Tx_Power+
CPICH_Adjustment

As mentioned previously, the broadcast value for the CPICH transmit power value is used by mobile devices as part of their own power setting. For example, a terminal sets an initial power for a first Random Access Channel (RACH) preamble as:

Preamble_Initial_Power=CPICH_Tx_Power+
UL_Interference+UL_Required_CI−CPICH_R-
SCP where the values for the CPICH transmit power CPICH_Tx_Power, the uplink interference UL Interference, and the uplink required C/I ratio UL_Required_CI are broadcast from the basestation, and the value for the CPICH received code power CPICH_RSCP is measured in the terminal itself.

It can therefore be seen that reporting an adjusted CPICH transmit power value would cause the terminal to send signals with excessive power on the uplink.

Therefore, in order to avoid this problem, in step 58, the femtocell basestation forms an adjusted value for the uplink interference value UL_Interference_Adjusted=UL_Interference−
CPICH_Adjustment This means that the terminal can use the adjusted values for the CPICH power and the uplink interference value without causing problems, because the sum of the adjusted values is the same as the sum of the unadjusted values. Thus, the terminal can set an initial power for its first RACH preamble exactly in accordance with the standard, without requiring any alteration to its own software, because the adjusted values reported by the femtocell basestation still produce the correct result.

In step 60, the CPICH adjustment factor is reported. Specifically, the value for the CPICH adjustment factor is reported in a specified one of the system information blocks that is not used for any other purpose. Software in each femtocell basestation can identify the appropriate system information block, and an upgrade to this software can take account of any change that may be required, for example if an unused system information block is later used for a different purpose.

In step 62, the adjusted value for the CPICH power is reported, and in step 64 the adjusted value for the uplink interference value is reported. These adjusted values are reported using the mechanisms specified in the standard for reporting the parameter values.

The process then ends at step 66.

If it is determined in step 52 that the present value for the variable CPICH_Tx_Power is not lower than the threshold value, the process passes to step 68, in which the unadjusted value for the CPICH power is reported, and to step 70, in which the unadjusted value for the uplink interference value is reported. In this case, an adjustment factor of zero can also be reported using the system information block discussed above.

Figure 3:
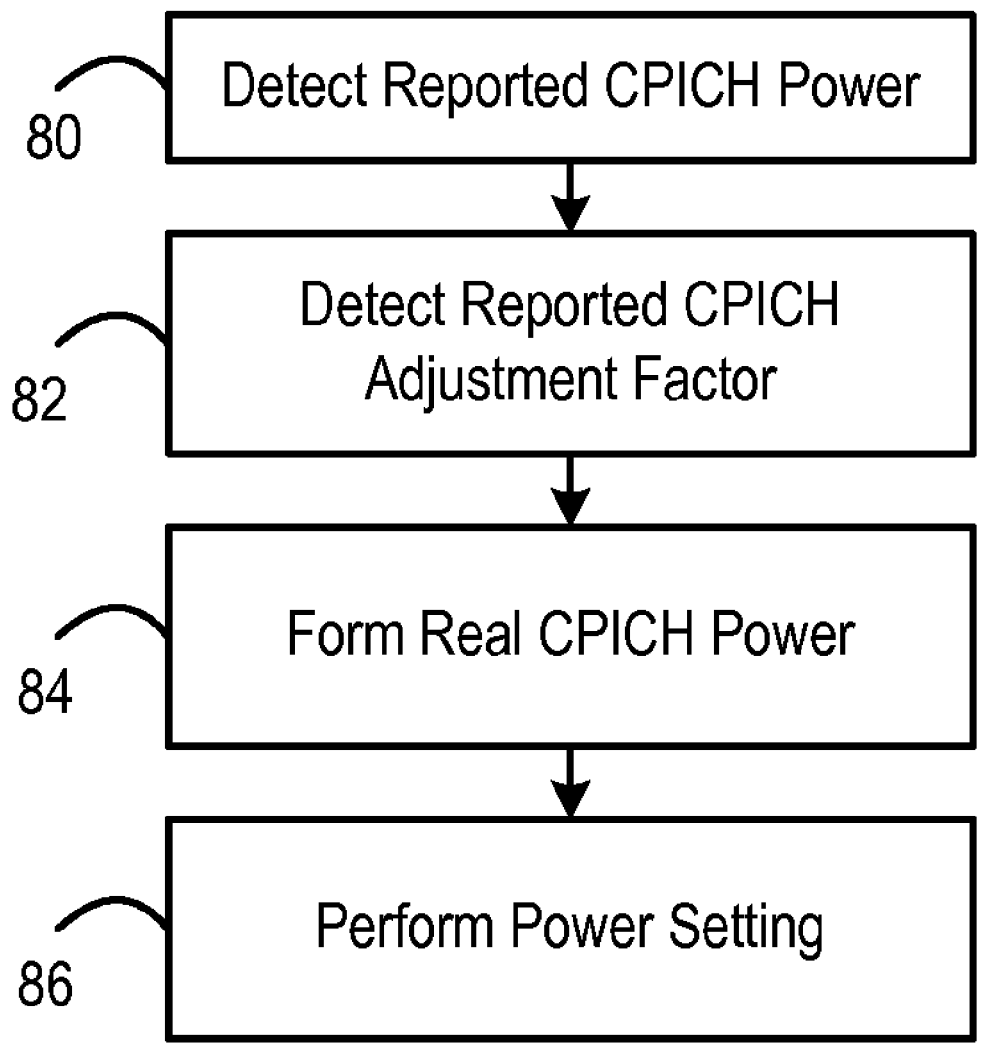
FIG. 3 is a flow chart, illustrating a second method in accordance with the invention.

FIG. 3 is a further flow chart, illustrating a method performed in a femtocell basestation, when detecting signals broadcast by another femtocell basestation in order to assist in its power setting procedure.

In step 80, the femtocell basestation detects the CPICH transmit power reported by the other femtocell basestation. In step 82, the femtocell basestation detects whether a CPICH adjustment factor has also been reported by the other femtocell basestation. If so, then, in step 84, the femtocell basestation determines the true CPICH transmit power of the other femtocell basestation by subtracting the CPICH adjustment factor from the reported value of the CPICH transmit power.

In step 86, the femtocell basestation then performs its power setting algorithms, using the determined value for the true CPICH transmit power. As mentioned above, these algorithms do not form part of the present invention, although one aspect may involve setting its own CPICH transmit power to be equal to the CPICH transmit power of the other femtocell basestation.

There is thus described a system for allowing a transmit power value to be reported, even when the true values falls outside a range that is reportable in accordance with the standard, while allowing terminals to perform their own power setting without modification.

The invention claimed is:

1. A basestation, for use in a cellular communications network, having a mechanism for reporting its transmit power, the basestation being configured, when its transmit power is outside a reportable range, to report an adjusted transmit power within the reportable range, and also to transmit an adjustment factor, by which the adjusted transmit power differs from the transmit power.

2. A basestation as claimed in claim 1, wherein the transmit power is a CPICH transmit power.

3. A basestation as claimed in claim 1 or 2, configured to transmit the adjustment factor in a predetermined System Information Block.

4. A basestation as claimed in claim 1 or 2, further configured to report an adjusted uplink interference value, which differs from an uplink interference value by said adjustment factor.

5. A basestation as claimed in claim 1 or 2, wherein the reportable range is determined by a cellular communications standard of said network.

6. A method, for use in a basestation of a cellular communications network, of reporting a transmit power, the method comprising:
when the transmit power is outside a reportable range, calculating an adjusted transmit power within the reportable range, and an adjustment factor, by which the adjusted transmit power differs from the transmit power;
reporting the adjusted transmit power; and
transmitting the adjustment factor.

7. A method as claimed in claim 6, wherein the transmit power is a CPICH transmit power.

8. A method as claimed in claim 6 or 7, comprising transmitting the adjustment factor in a predetermined System Information Block.

9. A method as claimed in claim 6 or 7, further comprising reporting an adjusted uplink interference value, which differs from an uplink interference value by said adjustment factor.

10. A basestation as claimed in claim 6 or 7, wherein the reportable range is determined by a cellular communications standard of said network.

11. A basestation, for use in a cellular communications network, wherein the basestation is configured to adapt its power settings based on a reported transmit power of at least one other basestation, and is further configured to detect the reported transmit power of the at least one other basestation and to detect an adjustment factor transmitted separately by the at least one other basestation, and to adapt its power settings based on a sum of the reported transmit power and the adjustment factor.

12. A method, for use in a basestation of a cellular communications network, the method comprising:
detecting a reported transmit power of at least one other basestation;
detecting an adjustment factor transmitted separately by the at least one other basestation;
forming a sum of the reported transmit power and the adjustment factor; and
adapt power settings of the basestation based on said sum of the reported transmit power and the adjustment factor.

* * * * *